(12) United States Patent
Hasegawa

(10) Patent No.: US 8,695,631 B2
(45) Date of Patent: Apr. 15, 2014

(54) PRESSURE RELEASE VALVE

(76) Inventor: Tom Hiroshi Hasegawa, Gardena, CA (US)

(*) Notice: Subject to any disclaimer, the term of this patent is extended or adjusted under 35 U.S.C. 154(b) by 262 days.

(21) Appl. No.: 13/369,120

(22) Filed: Feb. 8, 2012

(65) Prior Publication Data

US 2013/0199635 A1 Aug. 8, 2013

(51) Int. Cl.
*F16K 15/06* (2006.01)
*F16K 17/06* (2006.01)
*F16K 17/12* (2006.01)
*B65D 51/16* (2006.01)

(52) U.S. Cl.
USPC ............... 137/512.2; 137/533.17; 137/542; 220/203.27

(58) Field of Classification Search
CPC ....... A47J 27/09; A47J 27/092; F16K 15/063; F16K 17/02; F16K 17/0413; F16K 17/12
USPC .............. 137/512.2, 512.3, 533.17, 540, 542; 220/203.27, 203.29
See application file for complete search history.

(56) References Cited

U.S. PATENT DOCUMENTS

| | | | | |
|---|---|---|---|---|
| 2,297,378 A * | 9/1942 | Wittenberg | ............ | 137/534 |
| 2,424,393 A * | 7/1947 | Graves | ............ | 219/431 |
| 2,463,516 A * | 3/1949 | Burkhardt | ............ | 137/524 |
| 2,509,101 A * | 5/1950 | Kircher | ............ | 137/534 |
| 2,524,996 A * | 10/1950 | Sayers | ............ | 137/516 |
| 2,536,505 A * | 1/1951 | Kircher | ............ | 137/529 |
| 2,563,563 A * | 8/1951 | Swenson | ............ | 137/493 |
| 2,586,759 A * | 2/1952 | Zimmer | ............ | 137/534 |
| 2,619,982 A * | 12/1952 | Turner | ............ | 137/467 |
| 2,631,607 A * | 3/1953 | Keller | ............ | 137/494 |
| 2,635,630 A * | 4/1953 | Cornelius | ............ | 137/859 |
| 2,686,531 A * | 8/1954 | Eeckhout | ............ | 137/469 |
| 2,692,613 A * | 10/1954 | Waite | ............ | 137/534 |
| 2,710,627 A * | 6/1955 | Wagner et al. | ............ | 137/540 |
| 2,712,829 A * | 7/1955 | Whitaker | ............ | 137/469 |
| 3,949,781 A * | 4/1976 | Scalabrin | ............ | 137/532 |
| 4,160,462 A * | 7/1979 | Rossi-Ashton | ............ | 137/529 |
| 4,424,915 A * | 1/1984 | Horn | ............ | 220/316 |
| 4,799,508 A * | 1/1989 | Cuminale | ............ | 137/534 |
| 5,135,121 A * | 8/1992 | Javier | ............ | 220/203.07 |
| 5,507,311 A * | 4/1996 | Combe | ............ | 137/524 |
| 6,158,606 A * | 12/2000 | Oliver | ............ | 220/203.04 |
| 2004/0108000 A1* | 6/2004 | Raghavan et al. | ............ | 137/540 |

* cited by examiner

*Primary Examiner* — John K Fristoe, Jr.
*Assistant Examiner* — Frederick D Soski
(74) *Attorney, Agent, or Firm* — DLA Piper LLP (US)

(57) ABSTRACT

A pressure release valve including a holder element provided on the outside of the lid of a pressure cooker, a body packing disposed inside the holder element, a pressure release tube provided in the lower inside portion of the body packing, a valve plunger disposed in the body packing and comprising a shank portion and a beveled portion which is at the lower end of the shank portion and set on the upper end of the pressure release tube so as to allow the interior of the pressure release tube to be an empty space, a coil spring mounted on the valve plunger, a lock nut connected to the holder element, and a filtering cap provided fixedly or non-fixedly within the lock nut.

5 Claims, 4 Drawing Sheets

PRESSURE RELEASE VALVE

BACKGROUND OF THE INVENTION

1. Field of the Invention

The present invention relaters to a pressure cooker and more specifically to a pressure release valve used in a pressure cooker.

2. Prior Art

FIG. 8 illustrates the essential elements of one type of today's typical pressure release valve, disassembled, used in a pressure cooker and installed in the lid of a pressure cooker.

This pressure release valve substantially comprises a holding knob 1, a body packing 2 which is inside a holding element 3 and is connected by the supporting pin 1A to the holding knob 1 at its upper end, a valve plunger 4 installed inside the body packing 2 by being suspended by the supporting pin 1A.

The valve plunger 4 is integrally comprised of an upper shank portion 4A, a beveled portion 4B formed at the lower end of the upper shank portion 4A, and a lower shank portion 4C extending downward from the beveled portion 4B. A coil spring 5 is provided around the upper shank portion 4A of the valve plunger 4 to surround the upper shank portion 4A, with its upper end contacting the inside top portion of the body packing 2 and its lower end contacting the upper surface of the beveled portion 4B of the valve plunger 4. The lower shank portion 4C of the valve plunger 4 is inserted into a pressure release tube 6 that is threadedly connected to the body packing 2 so that the external thread 6a formed on the outer surface of the pressure release tube 6 is threadedly connected to the internal thread 2a formed on the inner surface of the body packing 2. The holding element 3, which has thereon the holding knob 1 and therein the body packing 2, the valve plunger 4, the coil spring 5 and the pressure release tube 6, is mounted on the lid 100 of a pot of a pressure cooler when a cylindrical lock nut 7 is threadedly connected to the holding element 3 so that the internal thread 7a formed on the inner surface of the cylindrical lock nut 7 is screwed to the external thread 3a formed on the outer surface of the holding element 3, with the surrounding area of an installation hole formed in the lid of the pressure cooker being sandwiched by the flange 3A of the holding element 3 and the upper end 7A of he cylindrical lock nut 7.

In this structure of the conventional pressure release valve, the pressure produced during cooking is maintained at a preset level that is set by the spring force of the coil spring 5 and the weight of the valve plunger 4, so that cocking under high pressure can be continued. When the pressure inside the pod of the pressure cooker becomes higher than a preset level, the pressure or pressurized steam passes through the space between the outer surface of the lower shank portion 4C of the valve plunger 4 and the inner surface of the pressure release tube 6 and raises the beveled portion 4B of the valve plunger 4 and then discharged out of the body packing 2 via an pressure discharge opening 2A, thus preventing the pressure inside the pod from becoming too high and thus preventing explosion of the pressure cooker.

However, the space, which is between the outer surface of the lower shank portion 4C of the valve plunger 4 and the inner surface of the pressure release tube 6 and is to adjust the flow amount of the pressure or pressurized steam, is as small as few millimeters. Accordingly, water from the steam can accumulate in the space and also food particle produced during cooking can also be caught in such a small space, thus creating clogging in the pressure release path that could lead to an explosion. Furthermore, since the space since between the outer surface of the lower shank portion 4C of the valve plunger 4 and the inner surface of the pressure release tube 6 is so small, release of the pressure inside the pot that is done after cooling is completed takes time, and thus the pressure release valve cannot meet the demand of after-cooking quick pressure release. In addition, during cooking food being cooked can come in direct contact with the constituting elements such as the valve plunger 4, the pressure release tube 6 and the lock nut 7, which could become the reason for clogging as well.

SUMMARY OF THE INVENTION

Accordingly, it is an object of the present invention to provide a pressure release valve that is free of the problems seen in the conventional pressure release valve.

It is another object of the present invention to provide a pressure release valve in which the pressure release valve includes no lower shank portion or pressure exhaust adjustment bar seen conventionally and is still able to provide an efficient pressure release and light weight pressure release valve.

The above objects are accomplished by a unique structure of the present invention for a pressure release valve that comprises:

- a holder element adapted to be provided in an attachment hole formed in the lid of a pressure cooker;
- a body packing provided inside the holder element so that the body packing is in close contact with the holder element and is slidable in its axial direction;
- a pressure release tube provided in the lower inside portion of the body packing;
- a valve plunger provided inside the body packing and comprised of a shank portion and a beveled portion which is of a truncated conical shape and is provided at the lower end of the shank portion so that the beveled portion is on the upper end of the pressure release tube and allows the interior of the pressure release tube to be an empty space;
- a coil spring provided on the shank portion of the valve plunger;
- a lock nut adapted to be threadedly connected to the holder element; and
- a filtering cap provided at the bottom of the lock nut.

With the structure described above, particularly the filtering cap and the pressure release tube which is an empty space, entering of food particle into the pressure release tube and body packing is prevented, and the inside of the pressure release tube is kept as an entire empty space so as to be used for smooth and rapid pressure release.

DETAILED DESCRIPTION OF THE INVENTION

Figure 1:
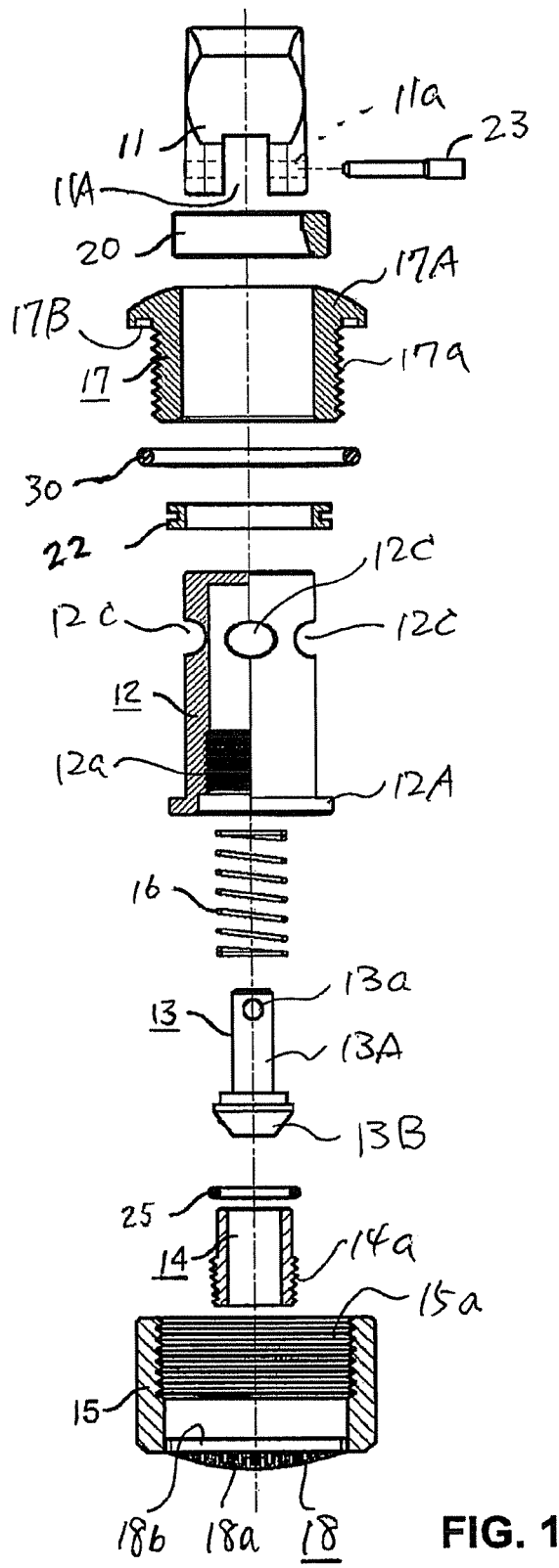
FIG. 1 is a cross-sectional disassembled view of a pressure release valve according the present invention.

The emergency pressure release valve according to the present invention is basically comprised of a holding knob 11, a lock nut 15, a holder element 17 that is threadedly connected to the lock nut 15 and provided therein with a body packing 12, a valve plunger 13 installed inside the body packing 12, a coil spring 16 provided around the valve plunger 13, and a filtering cap 18 provided in the lock nut 15.

More specifically, the lock nut 15, made of, for instance, aluminum, has a cylindrical shape tube and is formed with an internal thread 15a on its upper inner surface.

The holder element 17, made of, for instance, aluminum, is substantially a cylindrical element having an upper flange 17A on the upper outer circumference, and it is further formed with an external thread 17a so as to be threadedly connected to the lock nut 15. A circular groove 17B is formed in the under surface of the upper flange 17A so that a sealing ring 30 is set in this circular groove 17B for sealing purposes.

Figure 2:
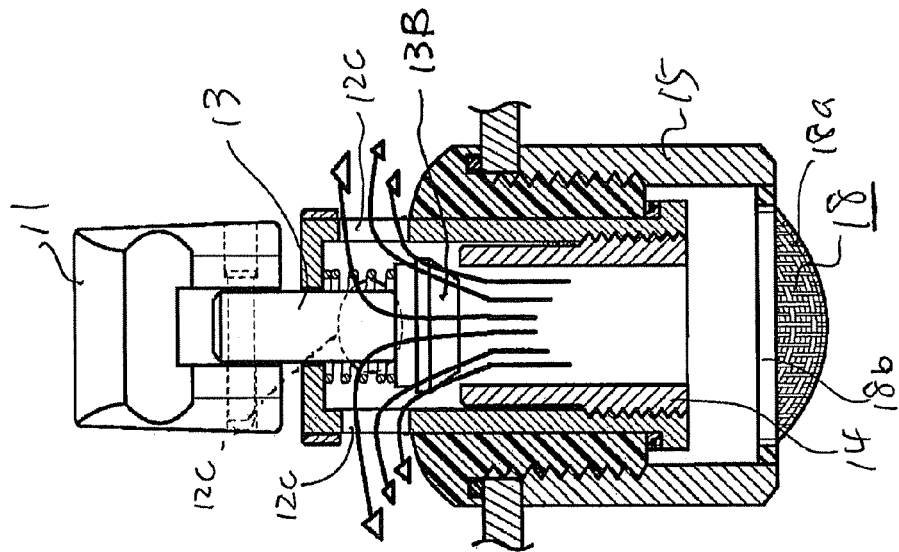
FIG. 2 shows in cross-section the pressure release valve according to a first aspect of the present invention before use in a pressure cooker wherein the filtering cap being fixed to the lock nut.

The cylindrical body packing 12, a substantially cylindrical element, is installed in the holder element 17 with its outer surface in tight or close contact with the inner surface of the holder element 17, and thus the body packing 12 is tightly held inside the holder element 17 by the elasticity of the holder element 17 but is still slidable in its axial direction within the holder element 17. The body packing 12 is formed with an internal thread 12a in the lower inside part thereof, and the pressure release tube 14 that has an external thread 14a in the lower portion is installed inside the body packing 12 by being threadedly connected to the body packing 12 by the threaded-engagement between the external thread 14a of the pressure release tube 14 and the internal thread 12a of the body packing 12. The bottoms of the body packing 12 and the pressure release tube 14 are set to be flush together as seen in FIG. 2. The body packing 12 is formed with an external flange 12A at the bottom, and a buffer ring 22 is set on the upper surface of the external flange 12A of the body packing 12. The body packing 12 is formed with four pressure release openings 12C (FIGS. 1 and FIGS. 2 through 7 show three openings) equally spaced from each other, and a stopper ring 20 is attached to the upper end of the body package 12 so as to prevent the body package 12 from entering into the holder element 17 for its entirety.

Inside the body packing 12 and on the pressure release tube 14, the valve plunger 13 is disposed. This valve plunger 13 is comprised of a shank portion 13A and a beveled portion 13B which is of a truncated conical shape and is provided at the bottom of the upper shank portion 13A. The shank portion 13A and the beveled portion 13B are integrally made of metal to make the valve plunger 13 of one piece, and the thus-made valve plunger 13 makes a pressure control weight. The diameter of the largest diameter portion of the beveled portion 13B is greater than the inner diameter of the pressure release tube 14 so that the beveled portion 13B (or the valve plunger 13) is set on the pressure release tube 14 and the beveled portion 13B is only partially within the upper end of the pressure release tube 14 or only a tip or lower end of the beveled portion 13B is inside the upper end of pressure release tube 14, thus allowing the interior of the pressure release tube 14 to be an empty space. This cylindrical inside empty space of the pressure release tube 14 is formed substantially by the entire inside height and inside diameter of the pressure release tube 14, and no part is disposed within the pressure release tube 14. A silicon-made gasket 25 can be mounted on the beveled portion 13B of the plunger 13.

The coil spring 16 is provided around the shank portion 13A of the valve plunger 13. The upper end of the coil spring 16 is in contact with the under surface of the top end portion of the body packing 12, and its lower end is in contact with the upper surface of the beveled portion 13B.

The holding knob 11 is formed with a lateral through hole 11a penetrating substantially horizontally through the holding knob 11, and this holding knob 11 is provided on the body packing 12. The holding knob 11 is substantially a cylindrical body having substantially the same outer diameter as that of the body packing 12 and is formed with a central recess 11A opened to the bottom, so that the upper end of the shank portion 13A of the valve plunger 13 is inside this central recess 11A. The shank portion 13A of the valve plunger 13 is formed with a lateral hole 13a diametrically penetrating through the shank portion 13A, and a holding pin 23 is inserted into this lateral hole 13a through the lateral through hole 11a of the holding knob 11. The valve plunger 13 is thus connected to the knob 11 so as to be suspended from the holding knob 11.

Furthermore, a dome-shaped filtering cap 18 is provided in the lock nut 15. This filtering cap 18 is comprised of a metal mesh casing 18a of a dome shape having numerous minute openings and a reinforcing circular frame 18b secured to the upper circumferential edge of the dome-shaped metal mesh casing 18a. The filtering cap 18 is provided in the lock nut 15 so as to be downwardly convex and so that the circular frame 18a is attached to the inside bottom of the lock nut 15 to cover the entire bottom opening of the lock nut 15. The filtering cap 18, instead, can be provided inside the lock nut 15 so that, as seen from FIG. 5 (and FIGS. 6 and 7), the circular frame 18a is not fixed to the lock nut 15 but is thus allowed to move within the lock nut 15 in the axial direction (or up and down) of the lock nut 15. In this structure, the circular frame 18a of the filtering cap 18 is set on an inside circumferential flange 15b formed at the inside bottom of the lock nut 15 and covers the entire bottom opening of the lock nut 15.

With the structure described above, as seen from FIG. 2, the holder element 17 that includes therein the body packing 12, the valve plunger 13 and the pressure release tube 14 is set into an attachment hole 100a opened in the lid 100 of a pressure cooker (not shown) from above (or from the outside of the lid), and then the lock nut 15 that has therein the filtering cap 18 is screw-attached to the holder element 17 from below (or from the inside of the lid), so that the holder element 17 makes an screw-engagement with the lock nut 15 with the lower surface of the upper flange 17A of the holder element 17 and the upper end of the lock nut 15 sandwiching the circumferential area of the hole of the lid 100. The sealing ring 30 is provided in the groove 17B formed in the upper flange 17A of the holder element 17 to secure a sealing between the pressure cooker lid 100 and the holder element 17. The valve plunger 13 sits on the pressure release tube 14 by being downwardly urged by the coil spring 16 against the upper end of the pressure release tube 14.

Figure 3:
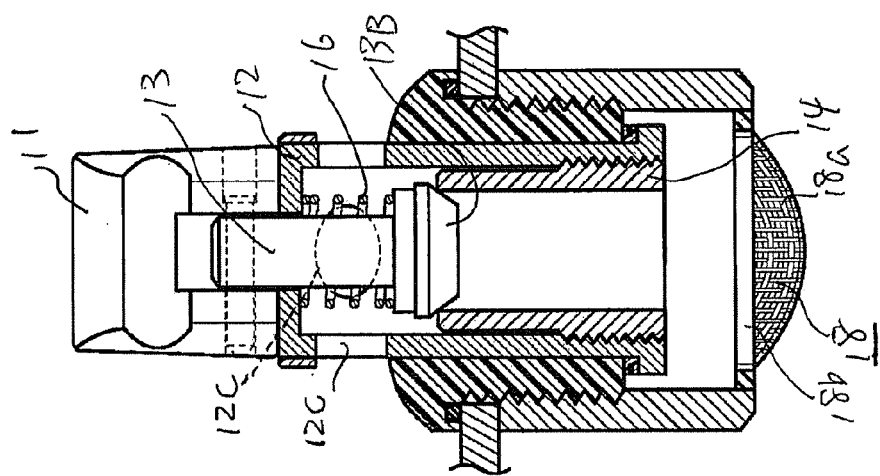
FIG. 3 shows in cross-section the pressure release valve of the first aspect of the present invention during use in a pressure cooker.

As seen from FIG. 3, when cooking proceeds, and the interior pressure of the pressure cooker increases, the pressurized stream pushes up, along with the body packing 12, the pressure release tube 14, of which upper opening is closed by the beveled portion 13B of the valve plunger 13.

Figure 4:
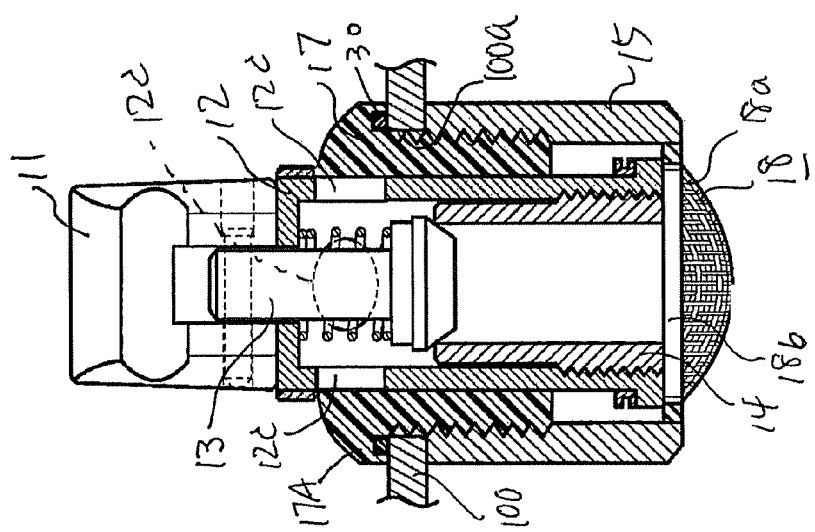
FIG. 4 shows in cross-section the pressure release valve of the first aspect of the present invention, releasing the pressure inside a pressure cooker.

When the interior pressure in the pot increases further and overcomes the spring force of the coil spring 16, as shown in FIG. 4, the pressurized steam in the pot pushes up the beveled portion 13B (in other words, valve plunger 13) compressing the coil spring 16, so that the interior of the body packing 12 and the interior of the pressure release tube 14 (in other words, interior of the pot of the pressure cooker) communicate with each other, and the pressurized steam or the inside pressure of the pot of the pressure cooker is, as shown by arrows in FIG. 4, exhausted out of the body packing 12 through the pressure release openings 12C, thus assuring the safety of the pressure cooking. When the inside pressure of the pot drops during the cocking, the valve plunger 13 can move back onto the pressure release tube 14 (as shown in FIG. 3), and the pressure cooking as a result is continued.

Figure 5:
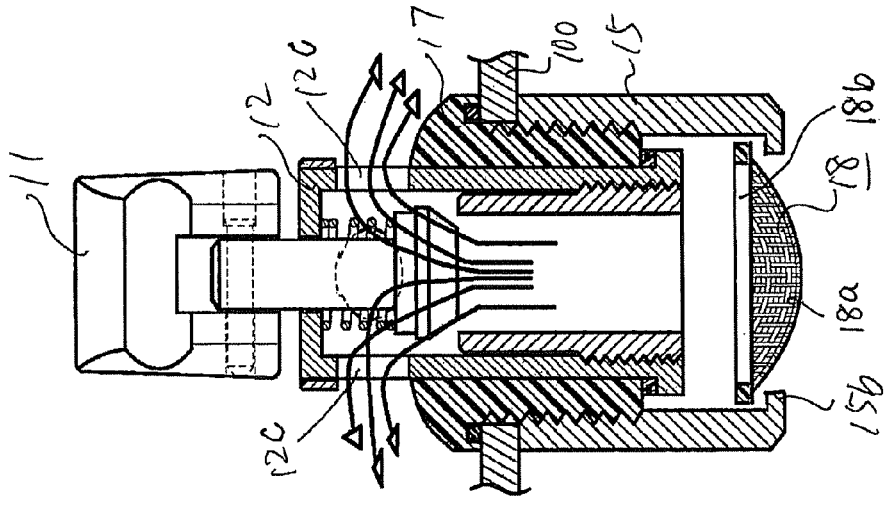
FIG. 5 shows in cross-section the pressure release valve according to a second aspect of the present invention before use in a pressure cooker wherein the filtering cap is movable in the lock nut.
Figure 6:
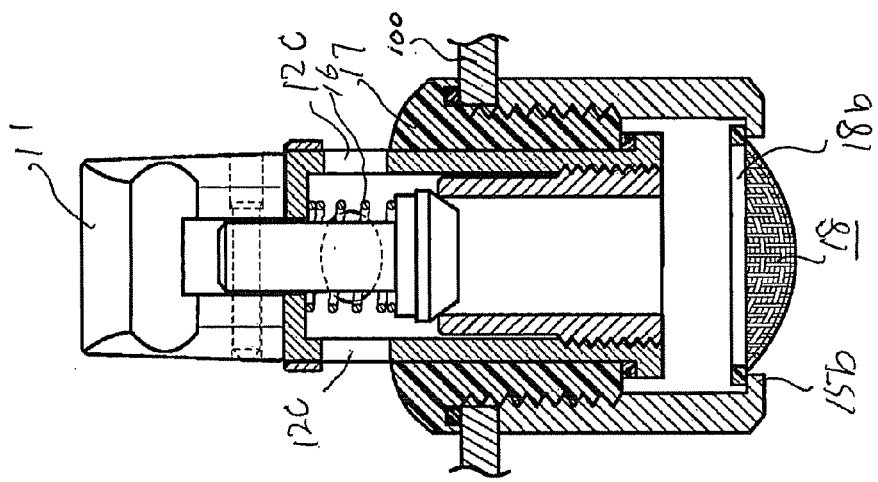
FIG. 6 shows in cross-section the pressure release valve of the second aspect of the present invention during use in a pressure cooker.
Figure 7:
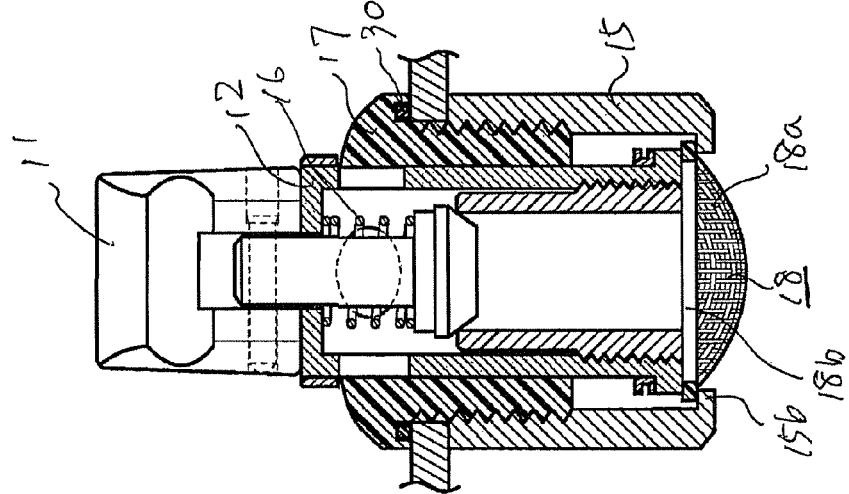
FIG. 7 shows in cross-section the pressure release valve of second aspect of the present invention releasing the pressure inside a pressure cooker.
Figure 8:
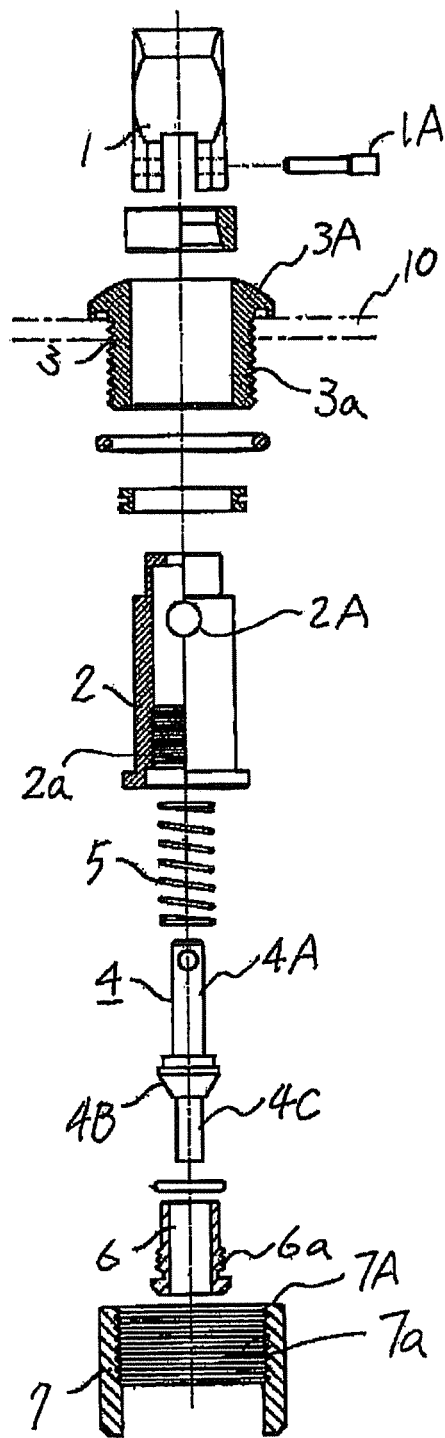
FIG. 8 is a cross-sectional disassembled view of a conventional pressure release valve.

In the structure of FIG. 5 in which the filtering cap 18 is not fixed to the lock nut 15, the filtering cap 18 can be lifted by the pressure or pressurized steam as shown in FIG. 7.

In the structure of both FIGS. 2 and 5, when pressure cooling is completed, the holding knob 11 can be operated by hand to raise the valve plunger 13 and separate the beveled portion 13B of the valve plunger 13 from the pressure release tube 14, thus allowing the inside pressure of the pot to be promptly released out of the pot of the pressure cooker.

As seen from the above, the pressurized steam or pressure in the pot can be released smoothly through the entire empty interior space within the pressure release tube 14 without being disrupted by the lower shank portion or exhaust adjustment bar seen in the conventional pressure cooker, and the pressure release can be done quicker compared to the conventional pressure cooker. Furthermore, since the filtering cap 18 is provided at the bottom of the lock nut 15, food particles produced during pressure-cooking are caught thereby, and thus clogging in the body packing 12 is prevented from occurring and smooth pressure release is assured and also contact of the food being cooked is prevented from contacting the constituting elements of the pressure release assembly. In addition, pressure release that is done after completion of cooking with the use of or operation of the holding knob 11 to raise the valve plunger 13 can be done in shorter time and more smoothly than in the conventional pressure cooker since there is no part that blocks the flow of the pressure or pressurized steam. Since the structure is simpler than the conventional pressure release valve, the size of the constituting elements such as the valve plunger 13 and pressure release tube 14 can be designed larger than the conventional ones, a pressure release valve considerably larger in size compared to the conventional pressure release valve can be manufactured, and the pressure release valve of the present invention can be easily used in a large scale cooking pot such as stock pots.

The invention claimed is:

1. A pressure release valve for a pressure cooker, comprising:
   a holder element adapted to be provided in an attachment hole formed in a lid of a pressure cooker,
   a body packing provided inside the holder element so as to be in close contact with the holder element and slidable in an axial direction thereof;
   a pressure release tube provided in a lower inside portion of the body packing;
   a valve plunger provided in the body packing and comprised of a shank portion and a beveled portion which is of a truncated conical shape and is provided at a lower end of the shank portion so as to be on an upper end of the pressure release tube and allow an interior of the pressure release tube to be an empty space;
   a coil spring provided on the shank portion of the valve plunger;
   a lock nut adapted to be threadedly connected to the holder element; and
   a filtering cap provided in the lock nut to cover a bottom opening of the lock nut.

2. The pressure release valve according to claim 1, wherein the filtering cap is comprised of a metal mesh casing of a dome shape and a circular frame secured to an upper circumferential edge of the metal mesh casing.

3. The pressure release valve according to claim 2, wherein the filtering cap is secured to a bottom of the lock nut and is convex outwardly.

4. The pressure release valve according to claim 2, wherein the circular frame of the filtering cap is set on an inside circumferential flange of the lock nut so that the filtering cap is convex outwardly and allowed to move within the lock nut.

5. The pressure release valve according to claim 4, wherein the filtering cap is movable in an axial direction of the lock nut.

* * * * *